US011353328B2

(12) United States Patent
Dorum

(10) Patent No.: US 11,353,328 B2
(45) Date of Patent: Jun. 7, 2022

(54) NAVIGATION SYSTEM, APPARATUS AND METHOD FOR ASSOCIATING A PROBE POINT WITH A ROAD SEGMENT

(71) Applicant: HERE GLOBAL B.V., Eindhoven (NL)

(72) Inventor: Ole Henry Dorum, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 399 days.

(21) Appl. No.: 16/177,925

(22) Filed: Nov. 1, 2018

(65) Prior Publication Data

US 2020/0141738 A1    May 7, 2020

(51) Int. Cl.
   *G01C 21/30*    (2006.01)
   *G01C 21/34*    (2006.01)

(52) U.S. Cl.
   CPC ......... *G01C 21/30* (2013.01); *G01C 21/3492* (2013.01)

(58) Field of Classification Search
   CPC .................. G01C 21/30; G01C 21/3492
   See application file for complete search history.

(56) References Cited

U.S. PATENT DOCUMENTS

| 2012/0116678 | A1  | 5/2012  | Witmer |           |
|---|---|---|---|---|
| 2013/0030690 | A1  | 1/2013  | Witmer |           |
| 2014/0044317 | A1  | 2/2014  | Mund et al. |       |
| 2014/0132608 | A1* | 5/2014  | Mund   | G01C 21/30 |
|              |     |         |        | 345/440    |
| 2014/0244164 | A1* | 8/2014  | Gale   | G01C 21/30 |
|              |     |         |        | 701/446    |
| 2014/0289267 | A1* | 9/2014  | Felix  | G01C 21/26 |
|              |     |         |        | 707/758    |
| 2014/0358436 | A1  | 12/2014 | Kim    |           |
| 2016/0377440 | A1  | 12/2016 | Dorum  |           |

(Continued)

FOREIGN PATENT DOCUMENTS

CN          102997928 A        3/2013

OTHER PUBLICATIONS

Chandio, A. A. et al., *Towards Adaptable and Tunable Cloud-Based Map-Matching Strategy for GPS Trajectories*, Frontiers of Information Technology & Electronic Engineering, vol. 17, Issue 12 (Dec. 2016) 16 pages.

(Continued)

*Primary Examiner* — Peter D Nolan
*Assistant Examiner* — Demetra R Smith-Stewart
(74) *Attorney, Agent, or Firm* — Alston & Bird LLP

(57) ABSTRACT

A navigation system, method, apparatus and computer program product process probe data utilizing map-centric map matching. In a method, the grid cell in which the probe point is located is determined from among a plurality of grid cells of a region. The method also projects the probe point onto a road center polyline segment associated with the grid cell. The road center polyline segment extends through a map matching road region having edges that are spaced apart from a road center of a road segment by a predefined distance such that a probe point inside a grid cell that is intersected by or included by the map matching region associates the probe point with the road center polyline segment and thereby with road segment as well. Traffic estimation and route guidance may be provided based upon the association of the probe point with the road segment.

20 Claims, 10 Drawing Sheets

(56) References Cited

U.S. PATENT DOCUMENTS

| | | | | |
|---|---|---|---|---|
| 2018/0224293 A1* | 8/2018 | Xu | ................... | G01C 21/3446 |
| 2019/0132709 A1* | 5/2019 | Graefe | ................... | H04W 4/38 |
| 2019/0360819 A1* | 11/2019 | Mao | ................... | G01C 21/362 |
| 2019/0376795 A1* | 12/2019 | Linder | ................ | H04W 4/024 |
| 2020/0065842 A1* | 2/2020 | Viswanathan | ..... | G06Q 30/0208 |
| 2020/0124438 A1* | 4/2020 | Fowe | ................ | G01C 21/3461 |

OTHER PUBLICATIONS

Quddus, M. A. et al., *Current Map Matching Algorigthms for Transport Applications: State-of-the art and Future Research Directions*, Transportation Research Part C: Emerging Technologies (2007) 29 pages.

Zhang, M. et al., *A Grid-Based Spatial Index for Matching Between Moving Vehicles and Road Network in a Real-Time Environment*, Proc. of the XXIV International Cartographic Conference (ICC), Santiago, Chile (Nov. 15, 2009) 10 pages.

\* cited by examiner

NAVIGATION SYSTEM, APPARATUS AND METHOD FOR ASSOCIATING A PROBE POINT WITH A ROAD SEGMENT

TECHNOLOGICAL FIELD

An example embodiment relates generally to the map matching of probe points to a corresponding road segment as represented by a map and, more particularly, to the map matching of probe points to road segments in a map-centric manner.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured.

In some instances, such as within a region for which a map consisting of a plurality of road segments has been created, the probe points may be matched to the map in order to identify the location along a road segment at which the probe point was captured. Map matching may be performed in real time, such as by navigation systems in order to identify the location of the probe point relative to the road segments represented by the map. For example, navigation systems mounted within a vehicle may perform real time map matching in order to depict the relative position of a probe point upon a map, thereby illustrating the current location of the vehicle. Map matching for real time applications may only utilize the path of probe points up to the most recent probe point since those are the only probe points that are known. Alternatively, map matching may rely upon post-processing, such as in instances in which the probe points captured by a plurality of GPS systems or navigation systems are matched to the road segments represented by a map for traffic estimation or other purposes. The accuracy of the map matching provided by post-processing may be improved relative to the map matching for real time applications since probe points captured subsequent in time to the probe point currently being processed are also known and may be referenced during the post-processing.

A variety of probe-centric map matching techniques have been developed. These map matching techniques include map matching techniques that utilize geometric analysis including point-to-point analysis, point-to-curve analysis and trajectory techniques. Other map matching techniques utilize a topological analysis of the road network to improve accuracy and performance. Some map matching techniques utilize probabilistic map-matching algorithms. The probabilistic map-matching algorithms attempt to identify the most probable road segment in some confidence region about a respective probe point. Additionally or alternatively, probabilistic map-matching algorithms may attempt to identify the most probable path in addition to the most probable road segment. The probabilistic map-matching algorithms may include, for example, Viterbi and hidden Markov model techniques. Further, map-matching techniques may include other types of map-matching algorithms including those that utilize Kalman and extended Kalman based techniques and those that utilize particle filters.

Whether performed in real time or as a post-processing technique, map matching has been a probe-centric process in which each probe point is analyzed to identify the closest road segment and the projection of the probe point onto the closest road segment. In order to identify the closest road segment, a separate spatial search is generally conducted for each probe point; even in instances in which a probe point is spaced a substantial distance from any road segment. Thus, the number of spatial searches to be conducted is generally proportional to the number of probe points.

Spatial searches are computationally expensive. For example, probe-centric map matching techniques for large probe data sets, such as millions of probe points, can incur substantial execution time and costs since the number of spatial searches is proportional to the number of probe points. Thus, map matching and, in particular, the spatial searches for each of the probe points may become a limiting factor at least for real time applications.

BRIEF SUMMARY

A navigation system, method, apparatus and computer program product are provided in accordance with an example embodiment in order to process probe data in accordance with a map-centric map matching technique. By utilizing a map-centric map matching technique, the navigation system, apparatus and method of an example embodiment associate a probe point with a road segment in a computationally efficient manner, particularly relative to, for example, the spatial searches conducted in accordance with a probe-centric map matching technique.

In an example embodiment, a navigation system is provided that includes a memory configured to store map data and processing circuitry configured to determine a grid cell in which a probe point is located from among a plurality of grid cells of a region. The processing circuitry is also configured to project the probe point onto a road center polyline segment associated with the grid cell. At least a portion of the road center polyline segment extends through a map matching road region having edges that are spaced apart from a road center of a road segment by a predefined distance such that a probe point inside a grid cell that is intersected by or included by the map matching region associates the probe point with the road center polyline segment and thereby with the road segment. The processing circuitry is further configured to estimate traffic along the road segment based upon the association of the probe point with the road center polyline segment and projection of the probe point onto the road center polyline segment. The processing circuitry of the navigation system is additionally configured to use an estimation of the traffic based upon the association of the probe point with the road center polyline segment in combination with the map data to provide route guidance for navigation purposes through the road network including the road segment.

In an example embodiment, the probe point is one of a plurality of probe points to be map matched. In this example embodiment, the processing circuitry is further configured to determine the grid cell in which each of the plurality of probe points is located from among the plurality of grid cells of the region. For the map matching road region, the processing circuitry is configured to identify one or more grid cells associated with the region including the grid cell in which the probe point is located. Separately for the one or more grid cells associated with the map matching road region including the grid cell in which the probe point is located, the processing circuitry of this example embodiment is configured to project one or more probe points that are located in a respective grid cell onto the road center polyline segment associated with the respective grid cell.

In an example embodiment, each of the plurality of grid cells is identified by a unique index. The processing circuitry of this example embodiment is configured to determine the grid cell in which the probe point is located by determining the index of the grid cell in which the probe point is located based upon positional coordinates at which the probe point is located. The processing circuitry of an example embodiment is further configured to determine that a second probe point is not located in a grid cell with which a road center polyline segment is associated with the processing of the second probe point then being completed without projecting the second probe point onto a road center polyline segment. The processing circuitry of an example embodiment is further configured to determine whether the heading associated with the probe point is within a predefined tolerance of the heading of the road center. The processing circuitry of this example embodiment is configured to project the probe point onto the road center polyline segment in a manner that is contingent upon the heading associated with the probe point satisfying the predefined tolerance. In an instance in which the grid cell in which the probe point is located is associated with the road center polyline segment and one or more second road center polyline segments, the processing circuitry is configured to project the probe point onto the road center polyline segment in a manner that is contingent upon a projection distance from the probe point to the road center polyline segment being shorter than a projection distance of the probe point to the one or more second road center polyline segments.

In another example embodiment, an apparatus is provided for associating a probe point with a road segment. The apparatus includes processing circuitry and at least one memory including computer program code with the at least one memory and the computer program code configured to, with the processing circuitry, cause the apparatus to determine a grid cell in which the probe point is located from among a plurality of grid cells of a region. The at least one memory and the computer program code are further configured to, with the processing circuitry, cause the apparatus to project the probe point onto a road center polyline segment associated with the grid cell. At least a portion of the road center polyline segment extends through a map matching road region having edges that are spaced apart from a road center of a road segment by a predefined distance such that a probe point inside a grid cell that intersects or is included by the map matching region is associated with the road center polyline segment and thereby with the road segment and projects the probe point onto the road center polyline segment.

The at least one memory and the computer program code are further configured to, with the processing circuitry, cause the apparatus to estimate traffic along the road segment based upon the association of the probe point with the road segment. In this example embodiment, the at least one memory and the computer program code are further configured to, with the processing circuitry, cause the apparatus to use an estimation of the traffic based upon the association of the probe point with the road segment to provide route guidance for navigation of a vehicle through a road network including the road segment.

In an example embodiment in which the probe point is one of a plurality of probe points, the at least one memory and the computer program code are further configured to, with the processing circuitry, cause the apparatus to determine the grid cell in which each of the plurality of probe points is located from among the plurality of grid cells of the region. For the map matching road region, the at least one memory and the computer program code are further configured to, with the processing circuitry, cause the apparatus to identify one or more grid cells associated with the region including the grid cell in which the probe point is located. Separately for the one or more grid cells associated with the map matching road region including the grid cell in which the probe point is located, the processing circuitry of this example embodiment is configured to project one or more probe points that are located in a respective grid cell onto the road center polyline segment associated with the respective grid cell.

In an embodiment in which each of the plurality of grid cells is identified by a unique index, the at least one memory and the computer program code are configured to, with the processing circuitry, cause the apparatus to determine the grid cell in which the probe point is located by determining the index of the grid cell in which the probe point is located based upon positional coordinates in which the probe point is located. The at least one memory and the computer program code are further configured to, with the processing circuitry, cause the apparatus of an example embodiment to determine that a second probe point is not located in a grid cell with which a road center polyline segment is associated such that processing of the second probe point is completed without projecting the second probe point onto a road center polyline. The at least one memory and the computer program code are further configured to, with the processing circuitry, cause the apparatus of an example embodiment to determine whether a heading associated with the probe point is within a predefined tolerance of a heading of the road center. In this example embodiment, the at least one memory and the computer program code are configured to, with the processing circuitry, cause the apparatus to project the probe point onto the road center polyline segment in a manner that is contingent upon the heading associated with the probe point satisfying the predefined tolerance. In an instance in which the grid cell in which the probe point is located is associated with the road center polyline segment and one or more second road center polyline segments, the at least one memory and the computer program code are configured to, with the processing circuitry, cause the apparatus to project the probe point onto the road center polyline segment in a manner that is contingent upon a projection distance from the probe point to the road center polyline segment being shorter than a projection distance of the probe point to the one or more second road center polyline segments.

In a further example embodiment, a method is provided for associating a probe point and a road segment. The method includes determining the grid cell in which the probe point is located from among a plurality of grid cells of a region. The method also projects the probe point onto a road center polyline segment associated with the grid cell. At least a portion of the road center polyline segment extends through a map matching road region having edges that are spaced apart from a road center of a road segment by a predefined distance such that a probe point inside a grid cell that intersects the map matching region associates the probe point with the road center polyline segment and thereby with the road segment, and projects the probe point onto the road center polyline segment.

The method of an example embodiment also includes estimating traffic along the road segment based upon association of the probe point with the road segment. The method of this example embodiment further includes using an estimation of the traffic based upon the association of the probe point with the road segment to provide route guidance for navigation of a vehicle through a road network including the road segment.

In an embodiment in which the probe point is one of a plurality of probe points, the method also includes determining the grid cell in which each of the plurality of probe points is located from among the plurality of grid cells of the region. For the map matching road region, method of this example embodiment identifies one or more grid cells associated with the region including the grid cell in which the probe point is located. Separately for the one or more grid cells associated with the map matching road region including the grid cell in which the probe point is located, the method of this example embodiment is configured to project one or more probe points that are located in a respective grid cell onto the road center polyline segment associated with the respective grid cell.

The method of an example embodiment also includes determining that a second probe point is not located in a grid cell with which a road center polyline segment is associated. As such, the processing of the second probe point in accordance with this example embodiment is completed without projecting the second probe point onto a road center polyline segment. In an instance in which the grid cell in which the probe point is located is associated with the road center polyline segment and one or more second road center polyline segments, the method of an example embodiment projects the probe point onto the road center polyline segment in a manner that is contingent upon a projection distance from the probe point to the road center polyline segment being shorter than a projection distance of a probe point to the one or more second road center polyline segments.

In yet another example embodiment, a computer program product is provided for associating a probe point with a road segment. The computer program product includes at least one non-transitory computer-readable storage medium having computer-executable program code portions stored therein. The computer-executable program code portions include program code instructions configured to determine a grid cell in which the probe point is located from among a plurality of grid cells of a region and to project the probe point onto a road center polyline segment associated with the grid cell. The edges of the map matching road region are spaced apart from a road center of a road segment by a predefined distance such that a probe point inside a grid cell that intersects the map matching region associates the probe point with the road center polyline segment and thereby with the road segment.

The computer-executable program code portions of an example embodiment also include program code instructions configured to estimate traffic along the road segment based upon association of the probe point with the road segment. The computer-executable program code portions of this example embodiment also include program code instructions configured to use an estimation of the traffic based upon the association of the probe point with the road segment to provide route guidance for navigation of a vehicle through a road network including the road segment.

In an embodiment in which the probe point is one of a plurality of probe points, the computer-executable program code portions also include program code instructions configured to determine the grid cell in which each of the plurality of probe points is located from among the plurality of grid cells of the region. For the map matching road region, the computer-executable program code portions of this example embodiment also include program code instructions configured to identify one or more grid cells associated with the region including the grid cell in which the probe point is located. Separately for the one or more grid cells associated with the map matching road region including the grid cell in which the probe point is located, the computer-executable program code portions of this example embodiment further include program code instructions configured to project one or more probe points that are located in a respective grid cell onto the road center polyline segment associated with the respective grid cell.

The computer-executable program code portions of an example embodiment further include program code instructions configured to determine that a second probe point is not located in a grid cell with which a road center polyline segment is associated such that processing of the second probe point is completed without projecting the second probe point onto a road center polyline segment. In an instance in which the grid cell in which the probe point is located is associated with the road center polyline segment and one or more second road center polyline segments, the computer-executable program code portions also include program code instructions configured to project the probe point onto the road center polyline segment in a manner that is contingent upon a projection distance from the probe point to the road center polyline segment being shorter than a projection distance of the probe point to the one or more second road center polyline segments.

BRIEF DESCRIPTION OF THE DRAWINGS

Figure 1:
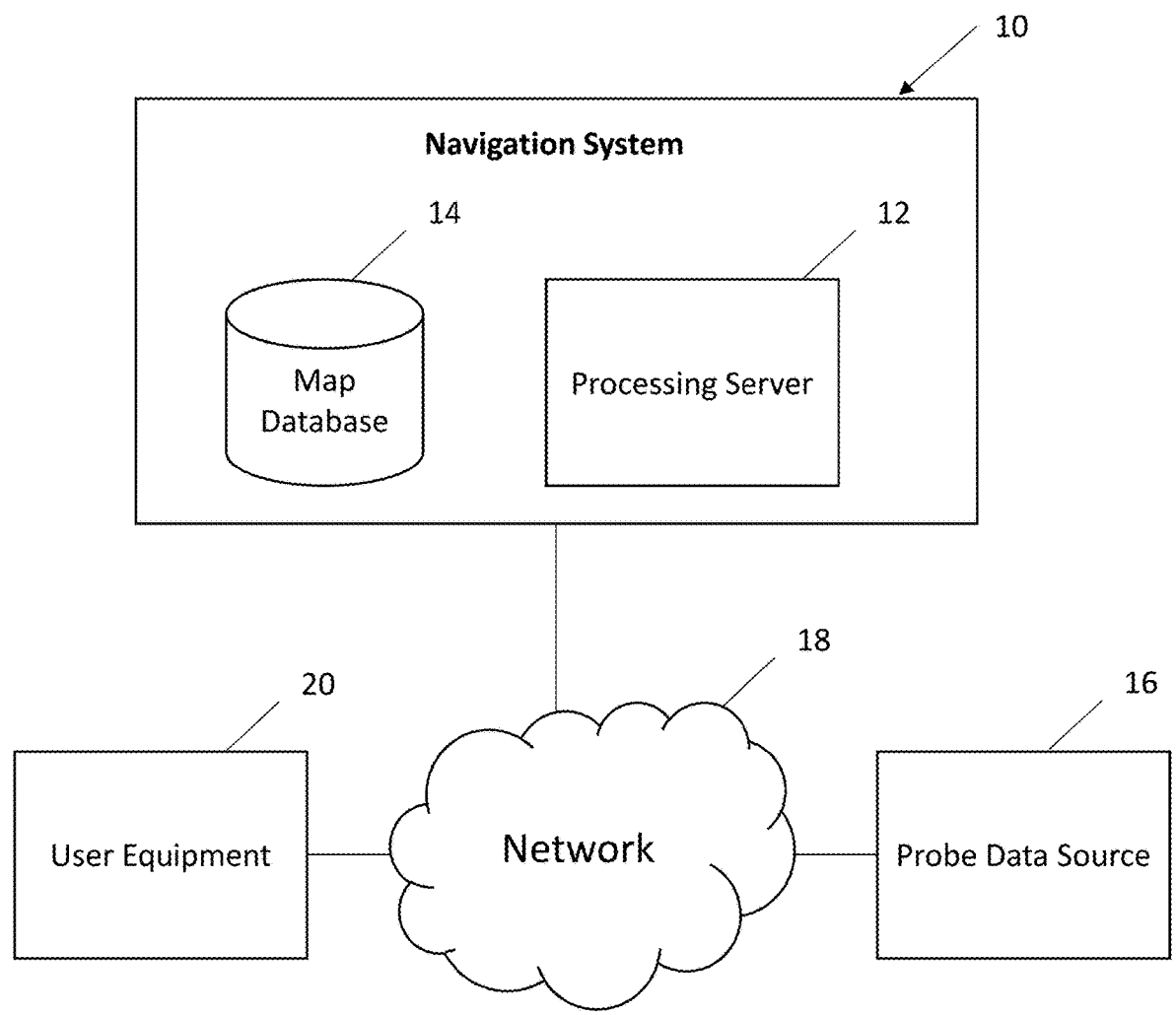
Figure 2:
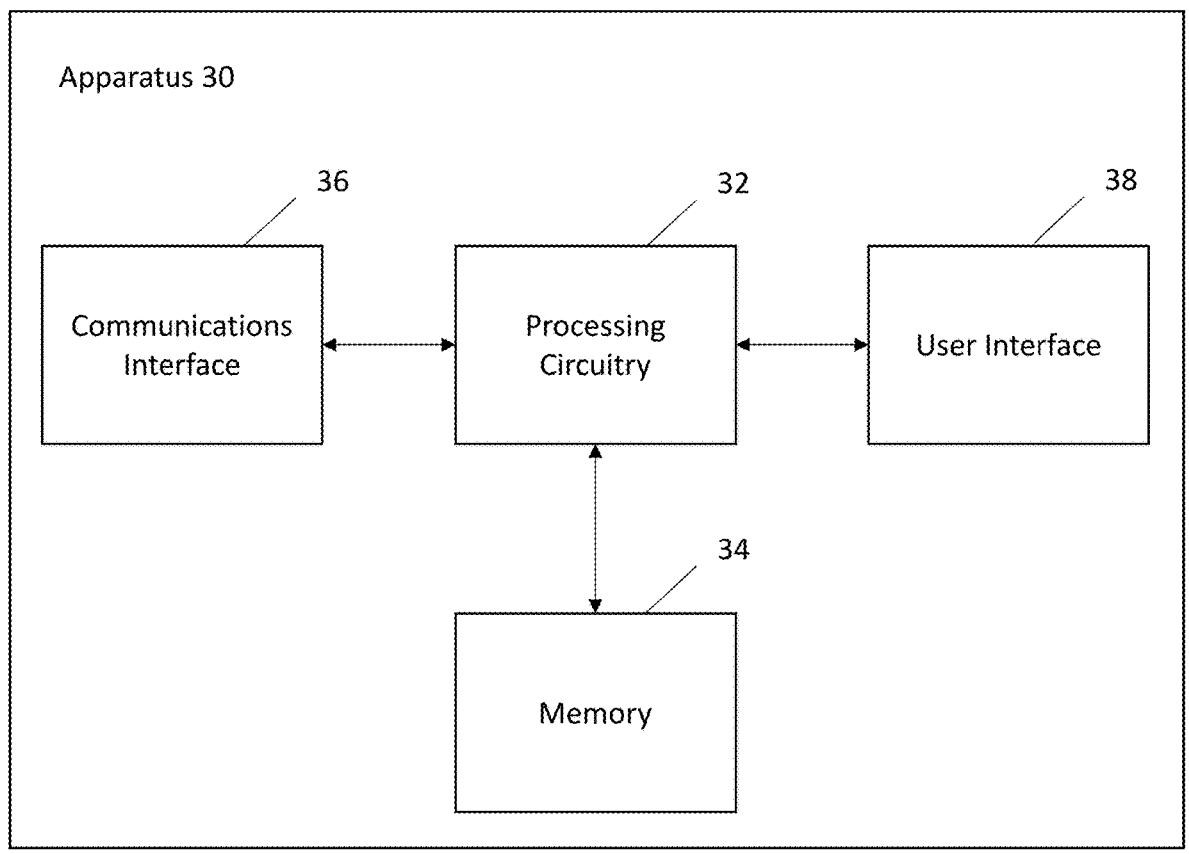
Figure 3:
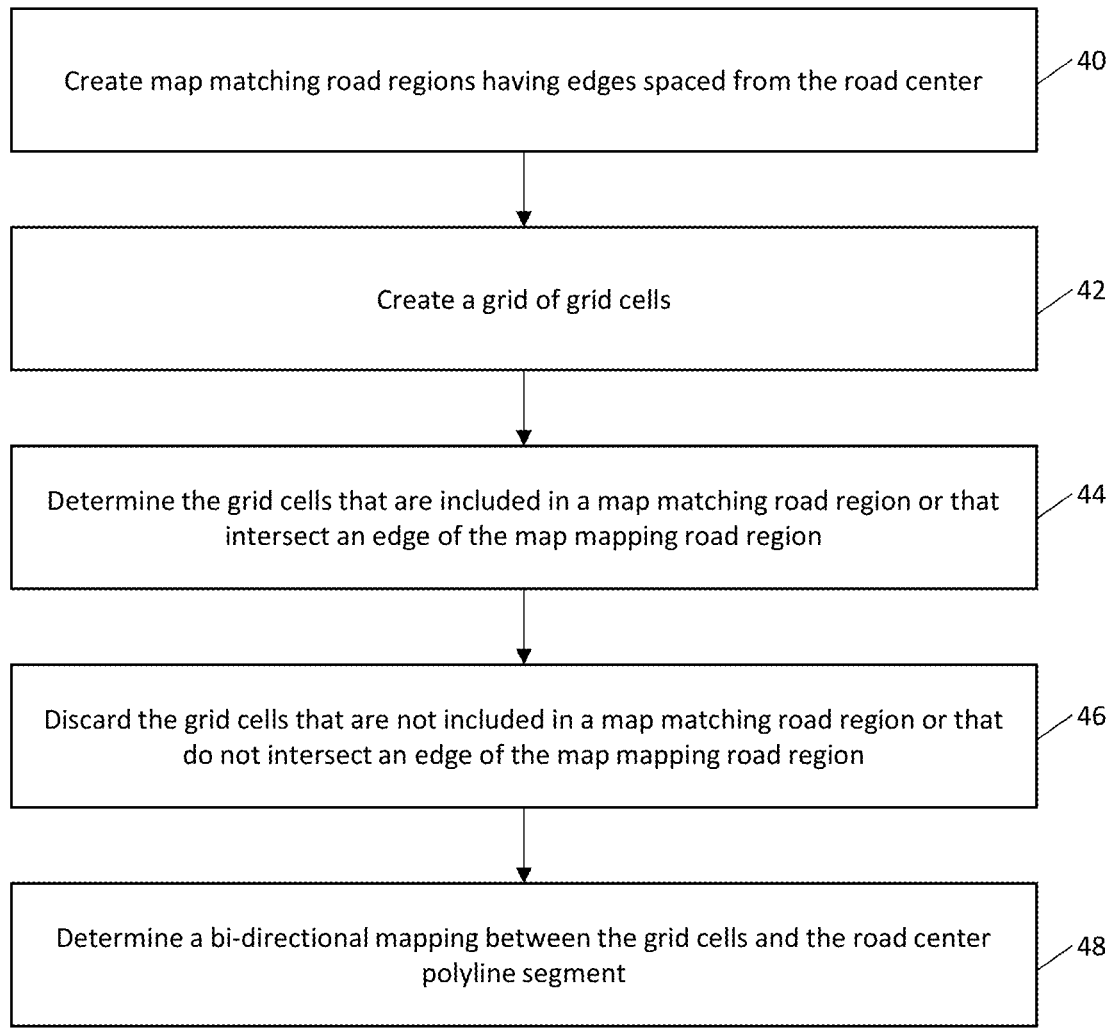
Figure 4:
Figure 5:
Figure 6:
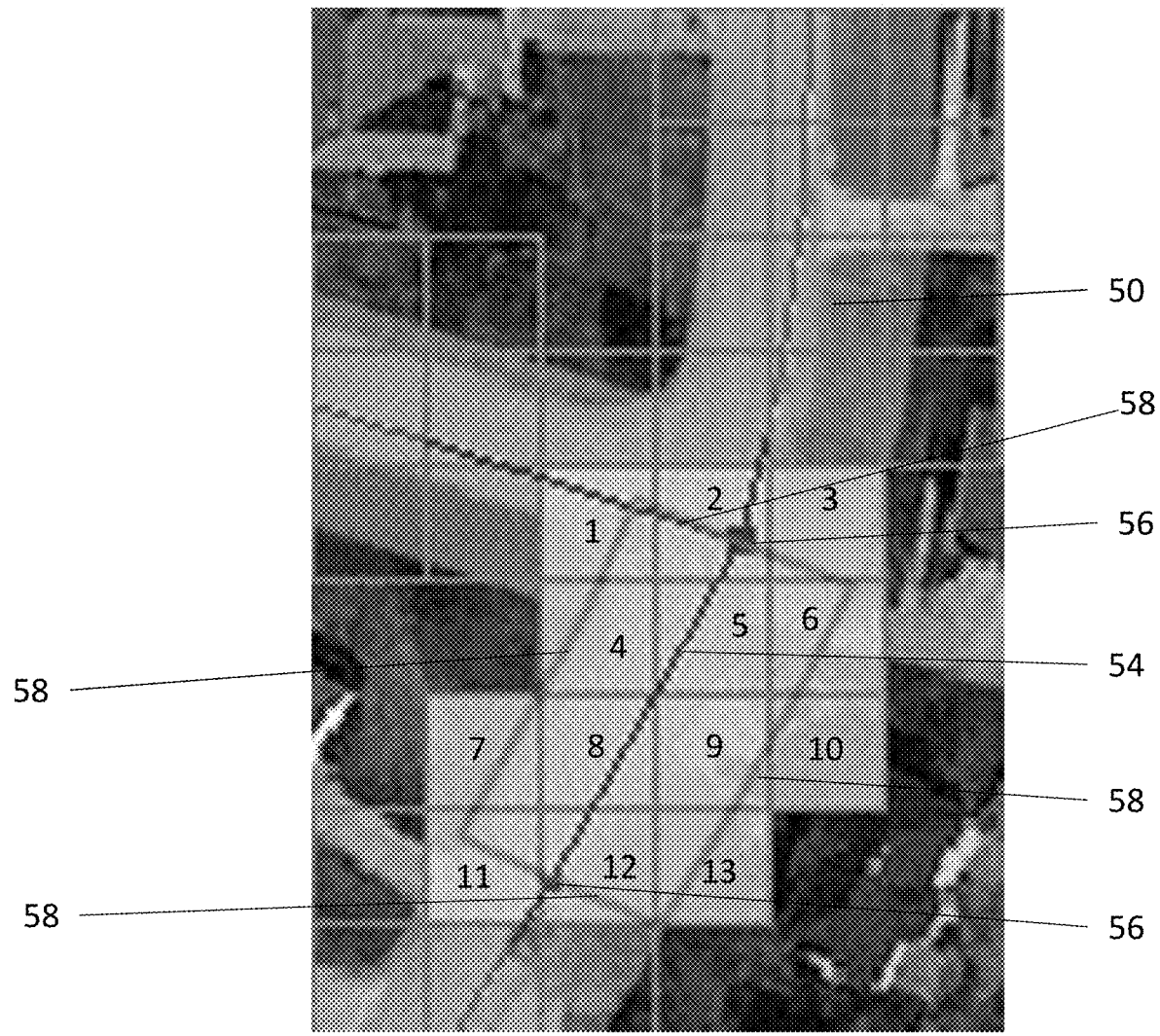
Figure 7A:
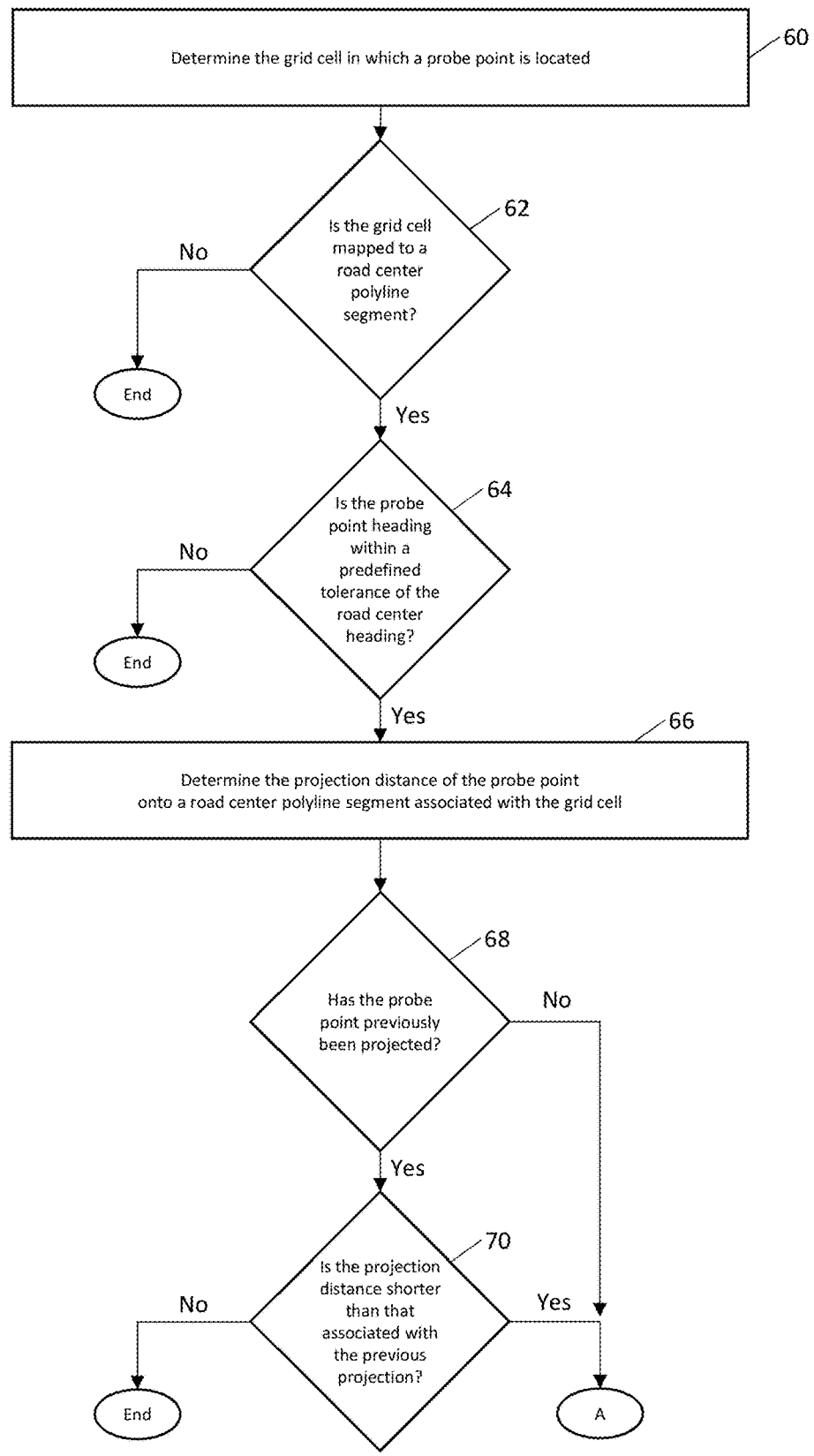
Figure 7B:
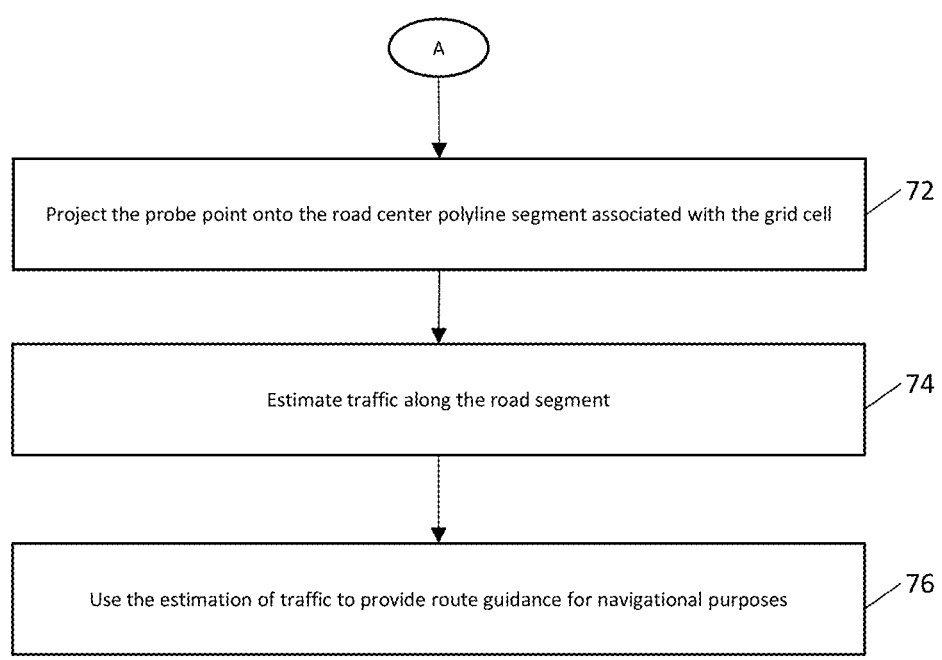
Figure 8:
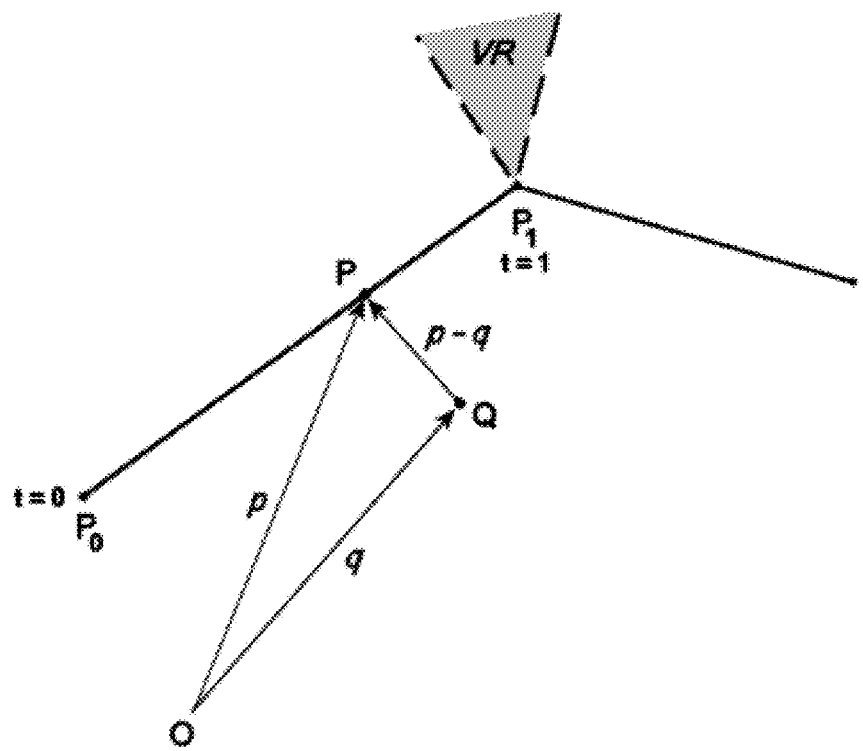
Figure 9:
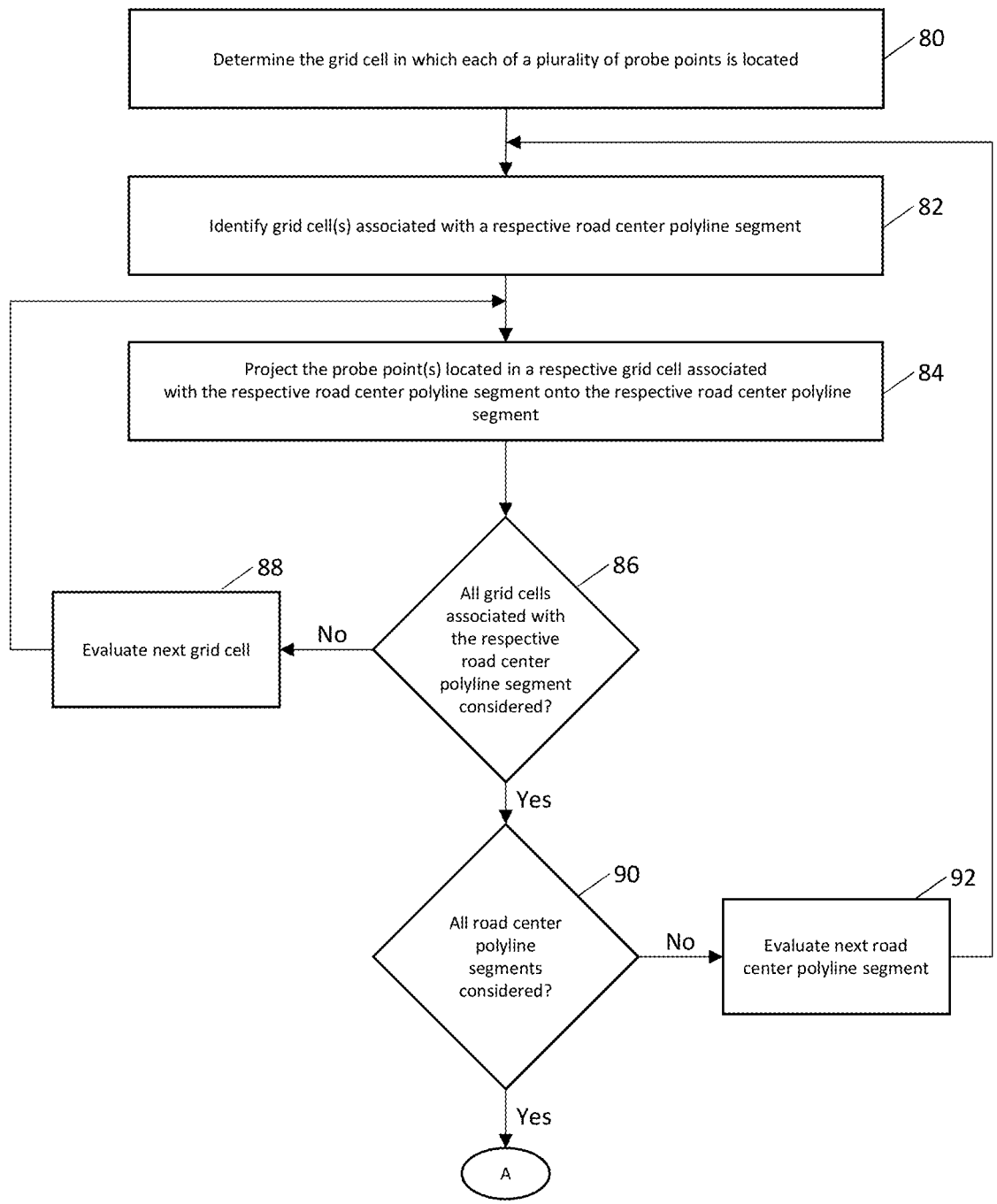

Having thus described certain example embodiments of the present disclosure in general terms, reference will hereinafter be made to the accompanying drawings, which are not necessarily drawn to scale, and wherein:

FIG. 1 is a block diagram of a navigation system that may be specifically configured in accordance with an example embodiment of the present disclosure;

FIG. 2 is an apparatus that may be specifically configured in order to associate a probe point with a road segment in accordance an example embodiment of the present disclosure;

FIG. 3 is a flowchart of the operations performed, such as by the apparatus of FIG. 2, in order to define a bi-directional mapping between grid cells and road center polyline segments in accordance with an example embodiment of the present disclosure;

FIG. 4 illustrates map matching road regions that have been defined relative to road segments of a portion of a road network in accordance with an example embodiment of the present disclosure;

FIG. 5 illustrates a plurality of grid cells that are associated with the map matching road regions that have been defined in the manner shown in FIG. 4 in accordance with an example embodiment of the present disclosure;

FIG. 6 is a graphical representation of the map matching road region of a road segment and the grid cells that are associated with the road center polyline segments in accordance with an example embodiment of the present disclosure;

FIGS. 7A and 7B collectively represent a flowchart illustrating operations performed, such as by the apparatus of FIG. 2, in order to associate a probe point with a road segment in accordance with an example embodiment of the present disclosure;

FIG. 8 is a graphical representation of the projection of a probe point onto a road center polyline segment in accordance with an example embodiment of the present disclosure; and FIG. 9 is a flowchart illustrating the operations performed, such as by the apparatus of FIG. 2, in order to associate a plurality of probe points with a road segment in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A navigation, apparatus, method and computer program product are provided in accordance with an example embodiment in order to map match probe points by associating probe points to a road segment of a map. The navigation system, apparatus, method and computer program product of an example embodiment associate the probe points with respect to road segments in a map-centric manner so as to conserve computational resources by performing the map matching with fewer computational operations and while requiring less computational time than probe-centric map matching techniques that generally require a plurality of computationally-expensive spatial searches. Relative to other map-centric map matching techniques, the navigation system, apparatus, method and computer program product of an example embodiment also provide increased computational efficiency by associating both probe points and road center polyline segments to grid cells and then performing the map matching of the probe points to the road center polyline segments. As such, the navigation system, apparatus, method and computer program product of an example embodiment need not spatially index the probe points and, as such, need not construct and maintain a spatial data structure that otherwise requires, particularly in instances in which there are a large number of probe points, significant computational resources to initialize and maintain as well as significant memory resources to store in instances in which.

The apparatus, method and computer program product of an example embodiment may be employed in a variety applications. For example, the apparatus, method and computer program product of an example embodiment may be utilized by a navigation system in order to estimate traffic conditions. The navigation system of an example embodiment may estimate traffic conditions in real time or near real time based upon the real time or near real time collection and processing of probe points. Alternatively, the navigation system of an example embodiment may estimate traffic conditions based upon probe points that have been previously collected and may be processed in mass. By efficiently map matching probe points to road segments and correspondingly estimating traffic conditions, the navigation system of an example embodiment may provide route guidance to vehicles traversing the road network that includes the road segments. The route guidance may be utilized for navigational purposes. This route guidance may be provided in various manners including the provision of visual route indications depicted, for example, upon a map presented by a display within a vehicle that outlines a route for the vehicle based upon the estimated traffic conditions. Alternatively, route guidance may be provided in the form of audible instructions to a driver. Still further, the route guidance may be utilized to direct an autonomous or semi-autonomous vehicle along the route.

One example of a navigation system 10 that may utilize the apparatus, method and computer program product of an example embodiment is depicted in FIG. 1. The navigation system of the illustrated embodiment includes a processing server 12 and a geographic map database 14. The navigation system is in data communication with one or more probe data source(s) 16 and one or more user equipment (UE) 20 through a network 18. The network may be wired, wireless, or any combination of wired and wireless communication networks, such as cellular, Wi-Fi, internet, local area networks, or the like. The navigation system of other embodiments may include additional, different, or fewer components.

The user equipment 20 may include a mobile computing device such as a laptop computer, tablet computer, mobile phone, smart phone, navigation unit, personal data assistant, watch, camera, or the like. Additionally or alternatively, the user equipment may be a fixed computing device, such as a personal computer, computer workstation, kiosk, office terminal computer or system, or the like. Processing server 12 may be one or more fixed or mobile computing devices. The user equipment may be configured to access the map database 14 via the processing server through, for example, a mapping application, such that the user equipment may provide navigational assistance to a user among other services provided through access to the navigation system 10.

The map database 14 may include node data, road segment data or link data, point of interest (POI) data, or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) also known as a context associated with the POI data records or other records of the map database.

The map database 14 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 20, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc.

As mentioned above, the map database 108 may be a master geographic database stored or accessible on the server side. However, in alternate embodiments, a client side map database may represent a compiled navigation database that may be used in or with end user devices (e.g., user equipment 20) to provide navigation and/or map-related functions. For example, the map database may be used with the user equipment to provide an end user with navigation features. In such a case, the map database can be downloaded or stored on the user equipment which can access the map database through a wireless or wired connection, such as via a processing server 12 and/or the network 18, for example.

In one embodiment, the user equipment 20 can be may be associated, coupled, or otherwise integrated with a vehicle, such as an advanced driver assistance system (ADAS) or other in-vehicle navigation system. Alternatively, the user equipment may be embodied as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment for navigation and map functions such as guidance and map display, for example, and for determination of one or more personalized routes or route segments based on one or more calculated and recorded routes, according to some example embodiments.

The processing server 12 may receive probe data from a probe data source 16. The probe data source may include one or more detectors or sensors as a positioning system built or embedded into or within a mobile device. Alternatively, the probe data source uses communications signals for position determination. The probe data source may receive location data from a positioning system, such as a global positioning system (GPS), cellular tower location methods, access point communication fingerprinting, or the like. The processing server may receive sensor data configured to describe a position of a probe data source, or a controller of the probe data source may receive the sensor data from the positioning system of a mobile device that embodies the probe data source. In this regard, a mobile device may include a system for tracking mobile device movement, such as rotation, velocity, or acceleration. Movement information may also be determined using the positioning system. This probe data may be collected by any device capable of determining the necessary information, and providing the necessary information to a remote entity. A mobile device, such as a phones or personal data assistant, is one example of a device that can function as a probe data source to collect probe data of a vehicle. Other examples of a probe data source include specialized vehicle mapping equipment, navigational systems, e.g., ADAS, or the like.

More specifically, probe data (e.g., collected by probe data source 16) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to an example embodiment in which the probe data is associated with motorized vehicles traveling along roadways, the probe data may include, without limitation, location data, (e.g., positional coordinates such as a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The probe data source may be any device capable of collecting the aforementioned probe data.

The navigation system 10 of an example embodiment, such as depicted in FIG. 1, may embody or otherwise be associated with or in communication with an apparatus configured to associate a probe point with a road segment. One example of an apparatus 30 configured to associate a probe point with a road segment is depicted in FIG. 2. As shown, the apparatus of an example embodiment may include, may be associated with or may otherwise be in communication with a processing circuitry 32 and a memory device 34 and optionally a communication interface 36 and/or a user interface 38.

In some embodiments, the processing circuitry 32 may be in communication with the memory device 34 via a bus for passing information among components of the apparatus 30. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processing circuitry. Additionally or alternatively, the memory device could be configured to store instructions for execution by the processing circuitry.

As noted above, the apparatus 30 may be embodied by a navigation system 10 as described above. However, the apparatus of other example embodiments may be embodied by a variety of other computing devices including, for example, an ADAS, a GPS system or the like. Additionally or alternatively, the apparatus may be embodied in other types of computing devices, such as a server, a personal computer, a computer workstation, a laptop computer, a plurality of networked computing devices or the like, that are configured to analyze probe points, such as for traffic estimation or other purposes.

The processing circuitry 32 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. In one embodiment, the processing circuitry is embodied by the processing server 12 of the navigation system 10 of FIG. 1. In some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processor. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be the processing circuitry of a specific device (for example, the computing device) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The apparatus 30 of an example embodiment also optionally includes a communication interface 36 that may be any means such as a device or circuitry embodied in either hardware or a combination of hardware and software that is configured to receive and/or transmit data from/to other electronic devices in communication with the apparatus, such as by being configured to receive probe data from the probe data sources 16 or from a database, cloud storage or other external memory device and/or to provide route guidance including, for example, a representation of the road geometry, to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 2, the apparatus 30 may also optionally include or otherwise be in communication with a user interface 38. The user interface may include a touch screen display, a keyboard, a mouse, a joystick or other input/output mechanisms. In some embodiments, the user interface, such as a display, speakers, or the like, may also be configured to provide output to the user. In this example embodiment, the processing circuitry 32 may comprise user interface circuitry configured to control at least some functions of one or more input/output mechanisms. The processing circuitry and/or user interface circuitry may be configured to control one or more functions of one or more input/output mechanisms through computer program instructions (for example, software and/or firmware) stored on a memory accessible to the processor (for example, memory device 34 and/or the like).

Prior to associating a probe point with a road segment, a bidirectional mapping between grid cells and road center polyline segments is created. In this regard, the earth or a portion of the earth, such as a country, a state or other geographical or political region, is subdivided in a plurality of tiles. Although the tiles may be differently shaped and sized, the tiles of an example embodiment all have the same size and shape. For example, the tile may be rectangular and, more particularly, square. In one embodiment, the tiles are sized to be of about the size as a relatively large city, such as Chicago, Ill. However, tiles may be defined to have different sizes, be it either larger or smaller sizes, in other example embodiments.

For each tile, a bidirectional mapping between grid cells and road center polyline segments is created. In order to create this mapping between grid cells and road center polyline segments, map matching road regions are initially created for each of a plurality of road segments of a road network. As will be understood from the subsequent discussion, the edges of the map matching road regions do not necessarily positionally correlate to the physical edges of a road segment. The virtual edges of the map matching road regions that are created are generally further from the road center than the physical edges of the road segment.

For a respective road segment, the apparatus 30 includes means, such as the processing circuitry 32 or the like, for creating two edges for the map matching road region, one on each side of the road center. See block 40 of FIG. 3. In this regard, a road segment may be represented by a polyline or a link that defines the center of the road segment and that extends lengthwise along the road segment. The polyline or link representative of a road segment may also define the heading of the road segment in some embodiments. A map matching road region edge is created on each of the two opposed sides of the road center represented by the polyline or the link with the edges of the map matching road region being spaced from the road center by a predefined distance. As such, the map matching road region edges extend in parallel with the road center and with one another. The predefined distance by which the map matching road region edges are perpendicularly spaced from the road center may be defined in various manners. As described below, a map matching tolerance T may be predefined as the maximum distance that a probe point can be spaced from a road center polyline segment in order to be potentially map matched to the road. In this example embodiment, the edge of the map matching road region may be perpendicularly spaced from the road center by a predefined distance that is based upon the map matching tolerance, such as by a predefined distance of T.

In order to create the bidirectional mapping between the grid cells and the road center polyline segments, the apparatus 30 of this example embodiment also includes means, such as the processing circuitry 32 or the like, for defining a plurality of grid cells. See block 42 of FIG. 3. Although the grid cells may be differently sized and shaped, the grid cells of an example embodiment are rectangular and, more particularly, square and each grid cell is equally sized. Although the dimensions of the grid cell may vary, the grid cells of an example embodiment have a square shape with each side having a predefined length that is smaller than the predefined distance by which the map matching road region edge is perpendicularly spaced from the road center. As with the predefined distance by which the map matching road region edges are perpendicularly spaced from the road center, the predetermined length of each side of the grid cells may be based upon the map matching tolerance T. In the foregoing embodiment in which the predefined distance by which the map matching road region edge is perpendicularly spaced from the road center is T, the length of the side of each square grid cell may be 0.4T, for example.

In order to increase the efficiency of the map matching process and to conserve memory resources, only those grid cells that are included by or intersect the map matching road regions are retained. Thus, grid cells that are not included by or otherwise intersect with a map matching road region are not retained in memory for future processing or other consideration. As such, the apparatus 30 of this example embodiment includes means, such as the processing circuitry 32 or the like, for determining whether a grid cell intersects any map matching road region edges or is included by any map matching road regions. See block 44 of FIG. 3. In an instance in which the grid cell intersects or is included by one or more map matching road regions, the grid cell is retained in memory, such as by including the indices of the grid cell as described below in memory. In one embodiment, the indices of grid cells that are included by or intersect one or more map matching road regions may be stored in a hash map. In contrast, in an instance in which a grid cell does not include or intersect one or more map matching road regions, the grid cell may not be retained in memory, such as by not including the indices of the grid cell in memory, thereby resulting in a sparse grid. Thus, the apparatus 30 of this example embodiment may include means, such as the processing circuitry or the like, for discarding the grid cell(s) that do not include or intersect a map matching road region, thereby conserving memory resources. See block 46 of FIG. 3.

Referring now to FIG. 4, a road network including a plurality of road segments along which the map matching road regions that have been created are depicted. The shaded map matching road region 50 that overlays and extends along the road segments is bounded on its opposite sides by the edges of the map matching road region that have been created. As shown, the shaded region bounded by the map matching road region edges that have been created is larger than most, if not all, of the road segments. FIG. 5 depicts the same portion of the road network as that shown in FIG. 4 and continues to depict the edges of the map matching road region that have been created and which bound the shaded map matching road region overlying the road segments. FIG. 5 also illustrates the grid cells 52 that have been created and that are retained as a result of intersecting or being included by one or more map matching road regions. FIG. 5 also illustrates that those regions that do not include road segments correspondingly do not include grid cells since the grid cells do not intersect or are included by one or more map matching road regions and, as such, have not been retained.

Once the map matching road regions and the grid cells have been created, the apparatus 30 of an example embodiment creates the bidirectional mapping between the grid cells and road center polyline segment such that the apparatus includes means, such as the processing circuitry 32 or the like, for determining the bidirectional mapping. See block 48. In this regard, the apparatus of example embodiment includes means, such as the processing circuitry or the like, for identifying, for each grid cell, the map matching road region of the respective road center polyline segment that intersect or include the respective grid cell. Likewise, for each road center polyline segment, the apparatus includes means, such as the processing circuitry or the like, for identifying the grid cells that are included by or otherwise are intersected by the map matching road region of the respective road center polyline segment. This bidirectional mapping between the grid cell and the road center polyline segments may be stored, for example, by memory 34. In an example embodiment, each road center polyline segment may be uniquely identified by a respective road center polyline segment identifier and each grid cell may be uniquely identified by respective grid cell indices, thereby facilitating the recordation of the bidirectional mapping. The bidirectional mapping may be saved and re-used for subsequent map matching operations with the bidirectional mapping only being incrementally updated in an instance in which the road network changes, thereby further conserving processing resources.

By way of example of the bidirectional mapping, FIG. 6 depicts a road segment that extends between first and second end points 56. FIG. 6 also depicts the road center polyline segment 54 of the road segment as well as the corresponding map matching road region polygon 58 that have been defined on opposite sides of the road center and going through the end points 56. The grid cells that are associated with this road segment are shaded and sequentially numbered with the grid cells either being included by or intersected by the edges of the map matching road region 58. By way of example of the mapping from grid cells to road center polyline segments, the grid cells designated 1 through 13 are mapped to the road center polyline segment 54.

The grid cells may be designated in various manners. In an example embodiment, the grid cells are identified by grid cell indices such as an x index and a y index. Each grid cell may be uniquely identified by its respective indices. In an embodiment in which the grid cells have the same size and shape, the grid cell that includes particular x,y coordinates may be identified based upon its indices, $(i_x, i_y)$ for a 2D array and $i_c$ for a 1D array representation. In this regard, the zero-based x and y indices ($i_x$, $i_y$) of a grid cell that includes the x,y coordinates may be defined as follows:

$$i_x = \left\lfloor N_x \frac{x - x_{min}}{x_{max} - x_{min}} \right\rfloor, \quad x \in [x_{min}, x_{max})$$

$$i_y = \left\lfloor N_y \frac{y - y_{min}}{y_{max} - y_{min}} \right\rfloor, \quad y \in [y_{min}, y_{max})$$

for a tile with minimum and maximum coordinates, ($x_{min}$, $y_{min}$) and ($x_{max}$, $y_{max}$) respectively that is partitioned into $N_x$ cells in the x-direction and $N_y$ cells in the y-direction, where $\lfloor \rfloor$ is the floor( ) function that provides the largest integer less than or equal to the argument of the floor function. When a 2D array is represented as a 1D array or list, the array index $i_c$ can be defined as follows:

$$i_c = i_x + i_y N_x$$

Once the bidirectional mapping between the grid cells and road center polyline segments has been constructed as described above in conjunction with FIG. 3, probe points may be mapped matched to a road center polyline segment. As shown in block 60 in FIG. 7A, the apparatus 30 of an example embodiment includes means, such as the processing circuitry 32 or the like, for initially determining the grid cell in which a probe point is located from among a plurality of grid cells of a region. The grid cell in which a probe point is located may be defined in various manners. In one embodiment, however, the positional coordinates, e.g., the x, y coordinates, of the probe point are utilized in order to determine the grid cell in which the probe point is located. For example, the x index $i_x$ and the y index $i_x$ of the grid cell may be determined based upon the positional coordinates associated with a probe point utilizing the foregoing equations that define the x and y indices of a grid cell based upon the x and y coordinates associated with a probe point.

Although the apparatus 30, such as the processing circuitry 32, of an example embodiment may proceed directly with the projection of the probe point onto a road center polyline segment that is mapped to a grid cell in which the probe point is located, the apparatus, such as the processing circuitry, of an example embodiment is configured to make the subsequent projection of the probe point onto a road center polyline segment contingent upon the satisfaction of one or more other criteria. As such, in an instance in which the probe point and the grid cell in which the probe point is located fail to satisfy the additional criteria, the apparatus, such as the processing circuitry, may cause the probe point to be excluded from further consideration, thereby conserving computational resources by avoiding the use of computational resources to determine the projection of a probe point onto a road center polyline segment in an instance in which the probe point and/or the grid cell in which the probe point is located fails to satisfy one or more other criteria. Conversely, if the probe point and the grid cell satisfy the other criteria, the apparatus, such as the processing circuitry, may project the probe point onto a road center polyline segment that is associated with the grid cell in which the probe point is located as described below.

The apparatus 30 of the embodiment of FIG. 7A therefore includes means, such as the processing circuitry 32 or the like, for determining whether the probe point is located in a grid cell with which a road center polyline segment is associated. See block 62 of FIG. 7A. In an instance in which the probe point is located in a grid cell that is not associated with a road center polyline segment, processing of the probe point may be completed without projecting the probe point onto a road center polyline segment, thereby conserving computational resources. In the example embodiment described above, grid cells that were not included by or otherwise intersected by any map matching road region were not retained and, as a result, were not stored in memory 34. Thus, in an instance in which the grid cell in which the probe point is located is not defined by or stored in memory, the apparatus, such as the processing circuitry, of this example embodiment is configured to determine that the grid cell in which the probe point is located is not associated with any road center polyline segments.

In an instance in which the grid cell in which the probe point is located is associated with one or more road center polyline segments and, as such, is included in memory 34, the apparatus 30 of an example embodiment also optionally includes means, such as the processing circuitry 32 or the like, for determining whether the heading associated with the probe point is within a predefined tolerance of the heading of the road center. See block 64. The projection of the probe point onto the road center polyline segment is therefore contingent upon the heading associated with the probe point satisfying the predefined tolerance, such as by being within the predefined tolerance, relative to the heading of the road center. In an instance in which the heading associated with the probe point and the heading associated with the road center differ by more than the predefined tolerance, processing of the probe point may be concluded without projecting the probe point onto a road center polyline segment, thereby conserving processing resources in this instance in which the heading of the probe point is inconsistent relative to the road segment under consideration.

Although examples of the filtering criteria that must be satisfied prior to projecting a probe point onto a road center polyline segment are described above, additional or different criteria may be utilized in other embodiments. For example, the speed associated with a probe point may be considered and only those probe points having a speed that satisfies, such as by being faster than, a minimal speed threshold are further evaluated in conjunction with the projection of the probe point onto a road center polyline segment, while probe points having slower speeds are not further processed in conjunction with the projection of the probe point onto a road center polyline segment.

In an instance in which the heading associated with the probe point is within the predefined tolerance of the heading associated with the road segment, the apparatus 30 includes means, such as the processing circuitry 32 or the like, for projecting the probe point onto the road center polyline segment associated with the grid cell. In this regard, the apparatus of an example embodiment includes means, such as the processing circuitry or the like, for determining a projection distance from the probe point to a projection point along the road center polyline segment. See block 66 of FIG. 7A. By way of example of the projection of the probe point onto a road center polyline segment, reference is now made to FIG. 8 in which probe point Q is projected onto projection point p on the road center polyline segment extending between vertices $p_0$ and $p_1$ by translating the probe point Q in a direction perpendicular to the edge at projection point p. In an example embodiment, the projection point p is derived by minimizing the vector inner product as follows:

$$d_{min} = |p - q| \text{ when} (Q-p) \cdot (p_1 - p_0) = 0$$

Since $p=p_0+t(p_1-p_0)$ with t being a projection parameter that parametrically expresses the projection point and defined as shown in FIG. 8 to vary linearly from t=0 at $p_0$ to t=1 at $p_1$, the foregoing equation may be expressed as:

$$[Q-p_0-t(p_1-p_0)] \cdot (p_1-p_0)=0$$

which yields the projection point $p=p_0+(p_1-p_0)$ expressed parametrically by t as follows:

$$t = \frac{|(Q-p_0) \cdot (p_1-p_0)|}{|p_1-p_0|}$$

The projection distance d is thus defined in the example of FIG. 8 as follows:

$$d = |p-q| = \frac{|(p_1-p_0) \times (p_0-Q)|}{|p_1-p_0|}$$

In an instance in which the road center is an analytical curve, such as a B-spline curve, the projection point p and projection distance d is defined in a comparable manner by minimizing the same inner product, but the line representative of the road center is replaced with the curve tangent vector p'. In this regard, the curve representative of the road center in this example embodiment may be initially approximated by a polyline, such as by use of the Douglas-Peucker algorithm, and an initial projection of the probe point may be performed to obtain an approximate curve projection parameter $t_0$. The curve parameter $t_0$ serves as an initial estimate and is utilized during a numerical optimization process, such as by using the Newton-Raphson algorithm, to minimize:

$$d_{min}=|p-q| \text{ when} (p-q) \cdot p'=0$$

wherein p' is the curve tangent vector at curve parameter t. This expression is analogous to the line projection discussed above.

A probe point may also be projected onto an end polyline vertex in various manners. In an example embodiment, however, the apparatus 30, such as the processing circuitry 32, is configured to determine if the probe point satisfies the end vertex projection criteria so as to be projected onto an end polyline vertex 56. In this regard, the apparatus of an example embodiment, such as the processing circuitry, is configured to determine a projection parameter for each road center polyline segment that intersects at the end polyline vertex. The projection parameter for a respective edge parametrically expresses a projection point at which the probe point is projected onto the end polyline vertex, the respective road center polyline segment or an extension of the respective road center polyline segment beyond the end polyline vertex. The apparatus, such as the processing circuitry, of an example embodiment is configured to determine the projection parameter in the manner described above, although the projection point for a respective road center polyline segment is the point at which the probe point is projected perpendicularly onto the respective road center polyline segment or an extension of the respective road center polyline segment beyond the end polyline vertex. As such, the probe point may be projected perpendicularly onto the respective road center polyline segment in an instance in which 0<t<1, the end polyline vertex in an instance in which t=0 or t=1 or the extension of the respective road center polyline segment in which t<0 or t>1.

With reference to FIG. 8, for example in which first and second road center polyline segments intersect at an end polyline vertex, the projection parameter for a first road center polyline segment $[p_0, p_1]$ is designated t, while the projection parameter for a second road center polyline segment $[p_1, p_2]$ is designated u. As shown, the probe point is projected onto the end polyline vertex in an instance in which t=1 or u=0, and the probe point is defined to fall within the shaded region VR (as defined between lines extending perpendicularly to the first and second road center polyline segments at the end polyline vertex $p_1$) in an instance in which t>1 and u<0 for the first and second edges, respectively, thereby indicating that the probe point projects perpendicularly onto extensions of both the first and second road center polyline segments. Further details regarding the projection of a probe point are provided by U.S. Patent Application Publication No. US 2016/0377440 to Ole Henry Dorum, the contents of which are incorporated herein in their entirety by reference.

In some instances, the grid cell in which the probe point is located may be associated with two or more road center polyline segments. Although the grid cell may be associated with multiple road center polyline segments, the probe point may only be projected onto a single one of the road center polyline segments and, in an example embodiment, the road center polyline segment that is closest to the probe point. Thus, the apparatus 30 of an example embodiment includes means, such as the processing circuitry 32, the memory 34 or the like, for determining whether the probe point has been previously projected, such as by being previously projected onto another road center polyline segment associated with the same grid cell, as indicated, for example, by an indication of the projection stored in association with the probe point. See block 68 of FIG. 7A. In an instance in which the probe point has not been previously projected, the apparatus includes means, such as the processing circuitry or the like, for projecting the probe point onto the road center polyline segment with which the grid cell is associated. See block 72 of FIG. 7B. In some embodiments, the probe point may have been previously projected in order to determine the projection distance such that the apparatus, such as the processing circuitry, associates the projection of the probe point, such as an indication of the road center polyline segment and, in some embodiments, the projection point p and/or the projection distance, with the probe point, such as by storing the association in memory.

As noted above, a map matching tolerance T may be predefined in an example embodiment. The map matching tolerance T may be the maximum projection distance of a probe point onto a road center polyline segment that is acceptable in order to project the probe point onto the road center polyline segment. Probe points that have a projection distance of greater than the map matching tolerance T may not be projected onto the road center polyline segment in this embodiment even if the other criteria are satisfied as the probe points are considered to be spaced too far from the road center polyline segment. Conversely, probe points having a projection distance of less than the map matching tolerance T may be projected onto the road center polyline segment in the manner described above.

Alternatively, in an instance in which the probe point has been previously projected, such as by being previously projected onto another road center polyline segment associated with the same grid cell, the apparatus 30 includes means, such as the processing circuitry 32 or the like, for determining whether the projection distance of the probe point to the road center polyline segment as described above in conjunction with block 66 is shorter than the projection distance associated with the previous projection of the probe point to another road center polyline segment. See block 70. In an instance in which the projection distance of the probe point to the road center polyline segment as described above in conjunction with block 66 is longer than the projection distance associated with the previous projection of the probe point to another road center polyline segment, the apparatus, such as the processing circuitry, is configured to cease further processing of the probe point relative to the respective road center polyline segment since the probe point is already projected onto another road center polyline segment that is closer. However, in an instance in which the projection distance of the probe point to the road center polyline segment as described above in conjunction with block 66 is shorter than the projection distance associated with the previous projection of the probe point to another road center polyline segment, the apparatus includes means, such as the processing circuitry or the like, for projecting the probe point onto the road center polyline segment with which the grid cell is associated as described above in conjunction with block 72. In addition to projecting the probe point onto the road center polyline segment and storing the association, such as in memory, the apparatus, such as the processing circuitry, is configured to remove the prior projection of the probe point to another road center polyline segment since the probe point has been determined to be closer to the road center polyline segment under evaluation. The foregoing process described above in conjunction with blocks 66-72 may be repeated for each road center polyline segment associated with the grid cell with the probe point, after consideration of each road center polyline segment, being projected onto the closest road center polyline segment.

In the foregoing example, an objective function that is based upon projection distance was utilized to determine the road center polyline segment, that is, the closest road, to which a probe point is to be projected. However, other objective functions may be utilized in order to determine the relationship, such as a positional relationship, of a probe point to a road center polyline segment and, as a result, to determine the road center polyline segment onto which the probe point is to be projected. Consequently, the use of projection distance as an objective function in the following discussion is provided by way of example, but not of limitation as other objective functions may be utilized instead of or in addition to projection distance.

In an example embodiment, the resulting map matching of probe points to the road center polyline segments may optionally be provided to a different form of map matcher, such as a trajectory-based map matcher in order to refine the results. For example, in an instance in which the map matching described above results in ambiguous results, such as by matching a probe point to multiple road center polyline segments, each of which is an equal distance from the probe point, the results from the foregoing map matching may be provided to a trajectory-based map matcher in order to resolve the ambiguities.

Once the probe point has been projected onto a road center polyline segment, the apparatus 30 of an example embodiment includes means, such as the processing circuitry 32 or the like, for estimating traffic along the road segment based upon the association of the probe point with the road center polyline segment. See block 74 of FIG. 7B. For example, in an instance in which a probe point represents a vehicle travelling along the road segment, the number of probe points associated with the road center polyline segment of a road segment provides an estimation of the traffic along the road segment. Utilizing this traffic estimation based upon the association of probe point with the road segment in combination with the map data defining the road segments of the road network, the apparatus of an example embodiment includes means, such as the processing circuitry, the user interface 38 or the like, for providing route guidance for navigation purposes through the road network. All other factors being equivalent, for example, the apparatus, such as the processing circuitry, may be configured to provide route guidance, such as by the visual presentation of route guidance, e.g., navigational arrows or the like, upon a map depicted by a display of the user interface, and/or the provision of audible instructions via the speakers of the user interface that provide the route guidance, such that lesser congested route segments are included in the route guidance while more heavily travelled road segments are excluded from the route guidance. For a driver of a vehicle, the driver may then follow the route guidance in order to avoid congested road segments and, correspondingly, arrive at their intended destination more quickly. In other embodiments, the navigation system 10 may be utilized in conjunction with an autonomous or semi-autonomous vehicle with the route guidance that is provided in accordance with an example embodiment being utilized to direct the path of travel of the vehicle.

As described above, the apparatus 30, method and computer program product may be utilized in a real time or near real time scenario in which a probe point is received and is then map matched as described above. Alternatively, the apparatus, method and computer program product of an example embodiment may map match a plurality of probe points that have been collected and, in some instances stored, with the map matching performed in mass. In this example embodiment and as shown in FIG. 9, the apparatus of an example embodiment includes means, such as the processing circuitry 32, the communication interface 36, the memory 34 or the like, for accessing a plurality of probe points. For example, the processing circuitry may retrieve the plurality of probe points from memory and/or may receive the plurality of probe points via the communication interface from an external database or other source. Thereafter, the apparatus includes means, such as the processing circuitry or the like, for determining the grid cell in which each of the plurality of probe points is located from among the plurality of grid cells of the region. See block 80 of FIG. 9. As described above in conjunction with block 60 of FIG. 7A, the grid cell in which each of the plurality of probes is located may be determined by the processing circuitry based upon the positional coordinates of the probe point and the predefined relationship between the positional coordinates and the indices of the grid cells.

The apparatus 30, such as the processing circuitry 32, of this example embodiment may then separately analyze each of the road center polyline segments. For a respective road center polyline segment, the apparatus of this example embodiment includes means, such as the processing circuitry or the like, for identifying the one or more grid cells associated with the respective road center polyline segment. See block 82. The apparatus, such as the processing circuitry, is configured to identify the grid cells associated with the road center polyline segment based upon the bi-directional mapping between the road center polyline segments and the grid cells, such as may be stored in memory 34. Separately for each of the one or more grid cells associated with the respective road center polyline segment, the apparatus of this example embodiment includes means, such as the processing circuitry or the like, for projecting the one or more probe points that are located in the respective grid cell onto the respective road center polyline segment that is associated with the respective grid cell. See block 84. This process will be repeated for each of the grid cells associated with a respective road center polyline segment and, in turn, for each of the road center polyline segments. See blocks 86-92 of FIG. 9. As described in conjunction with blocks 66-72 of FIG. 7A, the probe point that has already been projected onto a road center polyline segment may only be projected onto a different road center polyline segment of the same grid cell in an instance in which the projection distance to the different road center polyline segment is less than the projection distance to the road center polyline segment onto which the probe point has already been projected. The apparatus, such as the processing circuitry or this example embodiment is therefore configured to efficiently project a plurality of probe points onto road center polyline segments in order to thereafter allow for traffic estimation and the provision of navigational assistance.

As described above, a navigation system 10, apparatus 30, method and computer program product are provided in order to process probe data in accordance with a map-centric map matching technique. By utilizing a map-centric map matching technique, the navigation system, apparatus, method and computer program product of an example embodiment associate a probe point with a road segment in a computationally efficient manner, particularly relative to, for example, the spatial searches conducted in accordance with a probe-centric map matching technique. Moreover, the navigation system, apparatus, method and computer program product of an example embodiment utilize various filtering criteria in order to further limit the number of projections of probe points onto road center polyline segments, thereby further conserving computational resources while still map matching the probe points that can be reliably matched.

FIGS. 3, 7A, 7B and 9 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus 30 employing an embodiment of the present invention and executed by a processing circuitry 32 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A navigation system comprising:
   a memory storing map data; and
   processing circuitry configured to:
   determine a grid cell in which a probe point is located from among a plurality of grid cells of a region;
   determine that a second probe point is not located in a grid cell with which a road center polyline segment is associated;
   project the probe point onto the road center polyline segment associated with the grid cell in an instance in which the heading associated with the probe point satisfies the predefined tolerance, wherein at least a portion of the road center polyline segment extends through a map matching road region having edges that are spaced apart from a road center of a road segment by a predefined distance such that an intersection of the grid cell with the map matching road region or inclusion of the grid cell by the map matching road region associates the probe point with the road center polyline segment and projects the probe point onto the road center polyline segment; and
   use an estimation of traffic based upon an association of the probe point with the road segment in combination with the map data to provide route guidance for navigational purposes through a road network including the road segment.

2. A navigation system according to claim 1 wherein the probe point is one of a plurality of probe points, and wherein the processing circuitry is further configured to:
- determine the grid cell in which each of the plurality of probe points is located from among the plurality of grid cells of the region;
- for the road center polyline segment, identify one or more grid cells associated with the road center polyline segment including the grid cell in which the probe point is located; and
- separately for the one or more grid cells associated with the road center polyline segment including the grid cell in which the probe point is located, project one or more probe points that are located in a respective grid cell onto the road center polyline segment associated with the respective grid cell.

3. A navigation system according to claim 1 wherein each of the plurality of grid cells is identified by a unique index, and wherein the processing circuitry is configured to determine the grid cell in which the probe point is located by determining the index of the grid cell in which the probe point is located based upon positional coordinates at which the probe point is located.

4. A navigation system according to claim 1 wherein, in an instance in which the grid cell in which the probe point is located is associated with the road center polyline segment and one or more second road center polyline segments, the processing circuitry is configured to project the probe point onto the road center polyline segment in a manner that is contingent upon a projection distance from the probe point to the road center polyline segment being shorter than a projection distance of the probe point to the one or more second road center polyline segments.

5. A navigation system according to claim 1 wherein, in an instance in which the grid cell in which the probe point is located is associated with the road center polyline segment and one or more second road center polyline segments, the processing circuitry is configured to project the probe point onto the road center polyline segment in a manner that is contingent upon a projection distance from the probe point to the road center polyline segment being shorter than a projection distance of the probe point to the one or more second road center polyline segments.

6. A navigation system according to claim 1, wherein the processing circuitry is further configured to estimate the traffic along the road segment based upon the association of the probe point with the road segment.

7. A navigation system according to claim 1 wherein the memory and the processing circuitry are embodied by an advanced driver assistance system (ADAS).

8. An apparatus for associating a probe point with a road segment, the apparatus comprising processing circuitry and at least one memory including computer program code, the at least one memory and the computer program code configured to, with the processing circuitry, cause the apparatus to:
- determine a grid cell in which the probe point is located from among a plurality of grid cells of a region;
- in an instance in which the grid cell in which the probe point is located is associated with a road center polyline segment and one or more second road center polyline segments, project the probe point onto the road center polyline segment associated with the grid cell in a manner that is contingent upon a projection distance from the probe point to the road center polyline segment being shorter than a projection distance of the probe point to the one or more second road center polyline segments, wherein at least a portion of the road center polyline segment extends through a map matching road region having edges that are spaced apart from a road center of the road segment by a predefined distance such that an intersection of the grid cell with the map matching road region or inclusion of the grid cell by the map matching road region associates the probe point with the road center polyline segment and projects the probe point onto the road center polyline segment; and
- use an estimation of traffic based upon an association of the probe point with the road segment in combination with the map data to provide route guidance for navigational purposes through a road network including the road segment.

9. An apparatus according to claim 8 wherein the at least one memory and the computer program code are further configured to, with the processing circuitry, cause the apparatus to estimate the traffic along the road segment based upon the association of the probe point with the road segment.

10. An apparatus according to claim 8 wherein the probe point is one of a plurality of probe points, and wherein the at least one memory and the computer program code are further configured to, with the processing circuitry, cause the apparatus to:
- determine the grid cell in which each of the plurality of probe points is located from among the plurality of grid cells of the region;
- for the road center polyline segment, identify one or more grid cells associated with the road center polyline segment including the grid cell in which the probe point is located; and
- separately for the one or more grid cells associated with the road center polyline segment including the grid cell in which the probe point is located, project one or more probe points that are located in a respective grid cell onto the road center polyline segment associated with the respective grid cell.

11. An apparatus according to claim 8 wherein each of the plurality of grid cells is identified by a unique index, and wherein the at least one memory and the computer program code are configured to, with the processing circuitry, cause the apparatus to determine the grid cell in which the probe point is located by determining the index of the grid cell in which the probe point is located based upon positional coordinates at which the probe point is located.

12. An apparatus according to claim 8 wherein the at least one memory and the computer program code are further configured to, with the processing circuitry, cause the apparatus to determine that a second probe point is not located in a grid cell with which a road center polyline segment is associated such that processing of the second probe point is completed without projecting the second probe point onto a road center polyline segment.

13. An apparatus according to claim 8 wherein the at least one memory and the computer program code are further configured to, with the processing circuitry, cause the apparatus to determine whether a heading associated with the probe point is within a predefined tolerance of a heading of the road center, and wherein the at least one memory and the computer program code are configured to, with the processing circuitry, cause the apparatus to project the probe point onto the road center polyline segment in a manner that is contingent upon the heading associated with the probe point satisfying the predefined tolerance.

14. An apparatus according to claim 8 wherein the processing circuitry and the at least one memory are embodied by an advanced driver assistance system (ADAS).

15. A method for associating a probe point with a road segment, the method comprising:
    determining a grid cell in which the probe point is located from among a plurality of grid cells of a region;
    determine whether a heading associated with the probe point is within a predefined tolerance of a heading of a road center of a road segment;
    projecting the probe point onto a road center polyline segment associated with the grid cell in an instance in which the heading associated with the probe point satisfies the predefined tolerance, wherein at least a portion of the road center polyline segment extends through a map matching road region having edges that are spaced apart from a road center of the road segment by a predefined distance such that an intersection of the grid cell with the map matching road region or inclusion of the grid cell by the map matching road region associates the probe point with the road segment and projects the probe point onto the road center polyline segment; and
    using an estimation of traffic based upon an association of the probe point with the road segment in combination with the map data to provide route guidance for navigational purposes through a road network including the road segment.

16. A method according to claim 15 further comprising estimating the traffic along the road segment based upon the association of the probe point with the road segment.

17. A method according to claim 15 wherein the probe point is one of a plurality of probe points, and wherein the method further comprises:
    determining the grid cell in which each of the plurality of probe points is located from among the plurality of grid cells of the region;
    for the road center polyline segment, identifying one or more grid cells associated with the road center polyline segment including the grid cell in which the probe point is located; and
    separately for the one or more grid cells associated with the road center polyline segment including the grid cell in which the probe point is located, projecting one or more probe points that are located in a respective grid cell onto the road center polyline segment associated with the respective grid cell.

18. A method according to claim 15 further comprising determining that a second probe point is not located in a grid cell with which a road center polyline segment is associated such that processing of the second probe point completes without projecting the second probe point onto a road center polyline segment.

19. A method according to claim 15 wherein, in an instance in which the grid cell in which the probe point is located is associated with the road center polyline segment and one or more second road center polyline segments, projecting the probe point onto the road center polyline segment is contingent upon a projection distance from the probe point to the road center polyline segment being shorter than a projection distance of the probe point to the one or more second road center polyline segments.

20. A method according to claim 15, wherein the method is implemented by an advanced driver assistance system (ADAS).

* * * * *

UNITED STATES PATENT AND TRADEMARK OFFICE
CERTIFICATE OF CORRECTION

PATENT NO. : 11,353,328 B2
APPLICATION NO. : 16/177925
DATED : June 7, 2022
INVENTOR(S) : Ole Henry Dorum It is certified that error appears in the above-identified patent and that said Letters Patent is hereby corrected as shown below:

In the Claims

In Column 23, Lines 24-33, Claim 4, delete "A navigation system according to claim 1 wherein, in an instance in which the grid cell in which the probe point is located is associated with the road center polyline segment and one or more second road center polyline segments, the processing circuitry is configured to project the probe point onto the road center polyline segment in a manner that is contingent upon a projection distance from the probe point to the road center polyline segment being shorter than a projection distance of the probe point to the one or more second road center polyline segments." and insert -- A navigation system according to Claim 1 wherein the processing circuitry is further configured to determine whether a heading associated with the probe point is within a predefined tolerance of a heading of the road center, and wherein the processing circuitry is configured to project the probe point onto the road center polyline segment in a manner that is contingent upon the heading associated with the probe point satisfying the predefined tolerance. --, therefor.

Signed and Sealed this
Fourteenth Day of November, 2023

Katherine Kelly Vidal
*Director of the United States Patent and Trademark Office*